United States Patent
Hsu

(10) Patent No.: US 7,755,736 B2
(45) Date of Patent: Jul. 13, 2010

(54) LIQUID CRYSTAL DISPLAY PANEL WITH REFLECTIVE SPACERS AND LIQUID CRYSTAL DISPLAY DEVICE USING THE SAME

(75) Inventor: Yu-Pin Hsu, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 73 days.

(21) Appl. No.: 11/982,863

(22) Filed: Nov. 5, 2007

(65) Prior Publication Data

US 2008/0106688 A1    May 8, 2008

(30) Foreign Application Priority Data

Nov. 3, 2006    (TW) .............................. 95140746 A

(51) Int. Cl.
G02F 1/1339    (2006.01)
(52) U.S. Cl. ....................... 349/155; 349/114
(58) Field of Classification Search .................. 349/155, 349/157
See application file for complete search history.

(56) References Cited

U.S. PATENT DOCUMENTS

| 5,263,888 A | 11/1993 | Matsushita |
| 6,016,181 A * | 1/2000 | Shimada ..................... 349/156 |
| 6,184,956 B1 * | 2/2001 | Kang et al. .................. 349/113 |
| 6,784,958 B2 | 8/2004 | Jang |

FOREIGN PATENT DOCUMENTS

JP    10-319410 A    12/1998

* cited by examiner

Primary Examiner—Richard H Kim
(74) Attorney, Agent, or Firm—Wei Te Chung

(57) ABSTRACT

An exemplary liquid crystal display panel (20) includes a pair of substrates (210, 220) spaced from each other in a vertical direction, a liquid crystal layer (230) sandwiched between the substrates, a plurality of spacers (250) evenly distributed between the substrates to resist compression forces in the vertical direction, and a plurality of pixel regions. Each of the pixel regions defines a reflection region and a transmission region, and each of the spacers includes a reflective layer (252).

13 Claims, 3 Drawing Sheets

LIQUID CRYSTAL DISPLAY PANEL WITH REFLECTIVE SPACERS AND LIQUID CRYSTAL DISPLAY DEVICE USING THE SAME

CROSS-REFERENCE TO RELATED APPLICATION

This application is related to, and claims the benefit of, a foreign priority application filed in Taiwan as Ser. No. 095140746 on Nov. 03, 2006. The related application is incorporated herein by reference.

FIELD OF THE INVENTION

The present invention relates to liquid crystal display (LCD) panels, and more particularly to an LCD panel with spacers having reflective layer and an LCD device installing the LCD panel.

BACKGROUND

Because LCD devices have the advantages of portability, low power consumption, and low radiation, they have been widely used in various portable information products such as notebooks, personal digital assistants (PDAs), video cameras, and the like. Furthermore, LCD devices are considered by many to have the potential to completely replace CRT (cathode ray tube) monitors and televisions.

FIG. 4 shows an isometric, side view of a conventional LCD device. The LCD device 1 includes a liquid crystal panel 110 and a backlight module 130. The liquid crystal panel 110 includes a first substrate 111, a second substrate 113 opposite to the first substrate 111, a liquid crystal layer 115 interposed between the first and second substrates 111, 113, and a plurality of ball spacers 117. The ball spacers 117 are used for maintaining a gap between the first and second substrates.

Also referring to FIG. 5, a part cross-sectional view of the ball spacer 117 is shown. The ball spacer 117 includes a core portion 1171 and an adhesive layer 1172 enclosed the core portion 1171. The core portion 1171 may be made of polymethyl methacrylate (PMMA) particles or silicon oxide particles. Both of the core portion 1171 and the adhesive layer 1172 are transparent.

In operation, light beams emitted by the backlight module 130 pass through the second substrate 113, the liquid crystal layer 115, and the first substrate 111 from bottom to top in that order, for displaying images.

However, the ball spacers 117 are filled into the liquid crystal layer 115, whereby the liquid crystal molecules around the ball spacers 117 may be abnormally oriented along the outer surfaces of the ball spacers 117. Thus, light leakage is liable to exist at the regions that the ball spacers 117 are distributed, when the LCD device 1 displays a black image. Therefore, the display quality of the LCD device 1 would be impaired.

Accordingly, what is needed is an LCD panel can overcome the above-described deficiencies. What is also needed is an LCD device installing such LCD panel.

SUMMARY

A liquid crystal display panel includes a pair of substrates spaced from each other in a vertical direction; a liquid crystal layer sandwiched between the substrates; a plurality of spacers evenly distributed between the substrates to resist compression forces in the vertical direction; and a plurality of pixel regions. Each of the pixel regions defines a reflection region and a transmission region, whereby each of the spacers includes a reflective layer.

A liquid crystal display device includes a liquid crystal display panel; and a backlight module configured for illuminating the liquid crystal display panel. The liquid crystal panel includes a pair of substrates spaced from each other in a vertical direction, a liquid crystal layer sandwiched between the substrates, and a plurality of reflective spacers evenly distributed between the substrates to resist compression forces in the vertical direction.

Other novel features and advantages will become apparent from the following detailed description of preferred and exemplary embodiments when taken in conjunction with the accompanying drawings. In the drawings, all the views are schematic.

DETAILED DESCRIPTION OF PREFERRED EMBODIMENTS

Reference will now be made to the drawings to describe preferred and exemplary embodiments of the present invention in detail.

Figure 1:
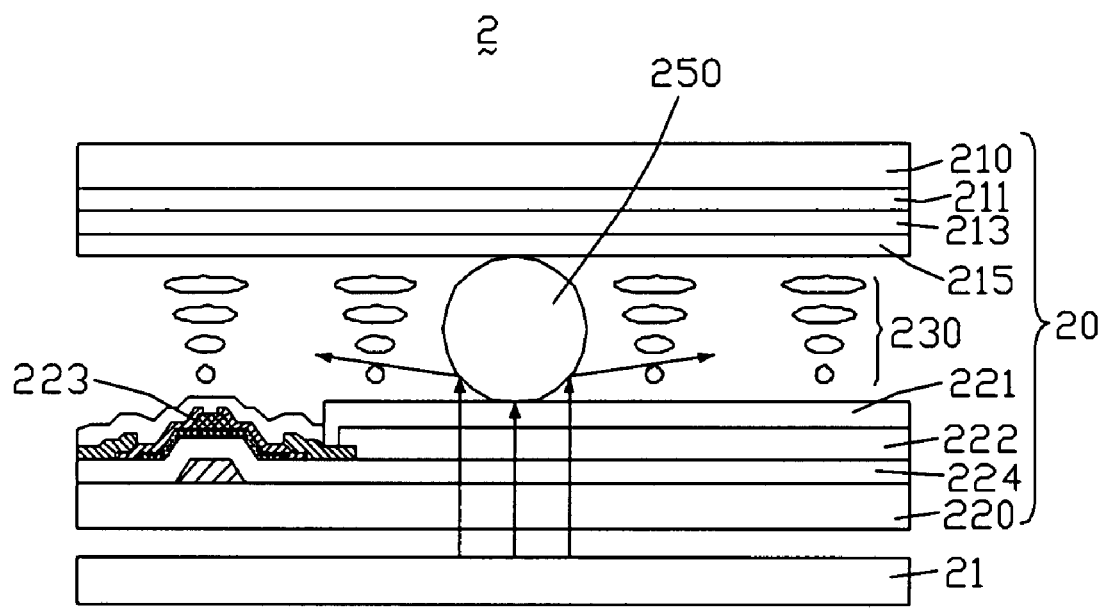
FIG. 1 is an isometric, side view of an LCD device according to an exemplary embodiment of the present invention.

Referring to FIG. 1, this is an isometric, side view of an LCD device according to an exemplary embodiment of the present invention. The LCD device 2 includes an LCD panel 20 and a backlight module 21 disposed under the LCD panel 20. The backlight module 21 provides a surface light source to illuminate the LCD panel 20. The LCD panel 20 is a kind of transflective panel, which includes a plurality of pixel regions, and each of the pixel regions defines a reflection region (not labeled) and a transmission region (not labeled).

The LCD panel 20 includes a color filter substrate 210, a TFT (thin film transistor) substrate 220 spaced apart and parallel to the first substrate 210, and a liquid crystal layer 230 interposed between the first and second substrates 210, 220. A plurality of spacers 250 are filled in the liquid crystal layer 230 and evenly distributed between the substrates 210, 220. The spacers 250 are used for forming a predetermined gap between the substrates 210, 220.

The color filter substrate 210 includes a color filter plate 211, a common electrode 213, and a first alignment film 215 disposed at an inner surface of the color filter substrate 210 from top to bottom in that order. The color filter plate 211 and the first alignment film 215 are made of transparent materials, and the common electrode 213 may be made of indium-tin-oxide (ITO), indium-zinc-oxide (IZO), or other materials with higher transmittance.

The TFT substrate 220 includes an array type TFT layer 223, an insulating layer 224, a pixel electrode 222, and a second alignment film 221 disposed at an inner surface of the TFT substrate 220. The insulating layer 224 and the second alignment film 221 are made of transparent materials, and the pixel electrode 222 may be made of indium-tin-oxide (ITO), indium-zinc-oxide (IZO), or other materials with higher transmittance.

Figure 2:
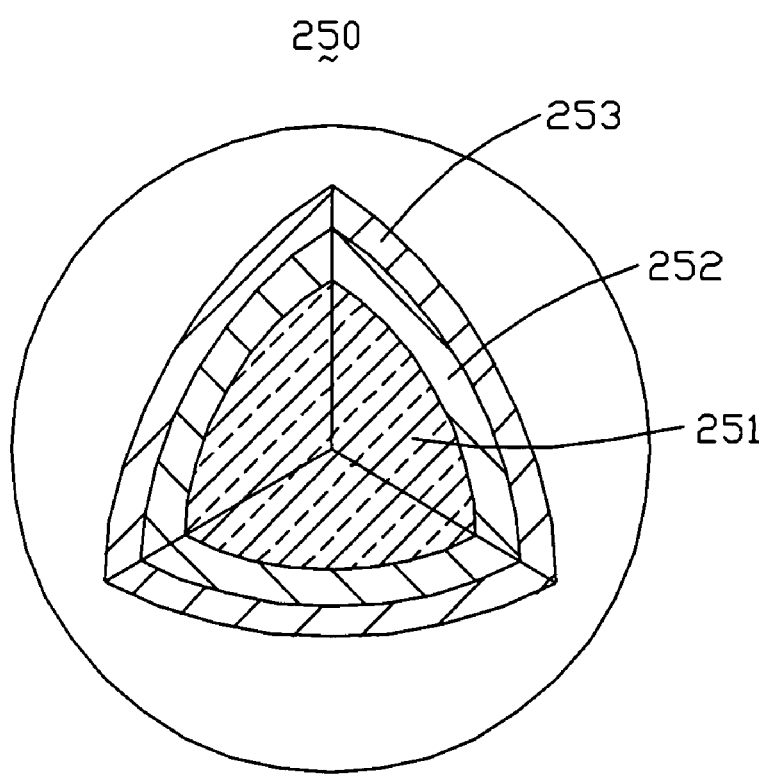
FIG. 2 is a part cross-sectional view of a spacer installing in the LCD device of FIG. 1, showing the spacer having a core portion, a reflective layer, and an adhesive layer.

Also referring to FIG. 2, a part cross-sectional view of the spacer 250 is shown. In this illustrated embodiment, each of the spacers 250 is a so-called ball spacer. The spacer 250 includes a core portion 251, a reflective layer 252, and an adhesive layer 253. The core portion 251 is a main body of the spacer 250, and is wholly and evenly coated by the reflective layer 252 and the adhesive layer 253 sequentially in that order. The core portion 251 may be made of polymethyl methacrylate (PMMA) particles or silicon oxide particles. The reflective layer 252 may be made of Barium sulfate ($BaSO_4$), Magnesium oxide (MgO), or other materials with high reflective ratio. The reflective layer 252 may be formed at the outer surface of the core portion 251 via plating or coating processes, or the like. The adhesive layer 253 is transparent.

When the LCD device 2 operates in a transmissive mode, light beams emitted by the backlight module are transmitted through the LCD panel 20 for displaying images. The spacers 250 with the reflective layers 252 filled in the liquid crystal layer 230 are capable of reflecting light beams transmitted thereto, such that light leakage can be eliminated when the LCD device 2 displays a black image. Accordingly, the LCD device 2 has a high quality, reliable display.

On the other hand, when the LCD device 2 operates in a reflective mode, whereby the backlight module 21 is turned off, and ambient light beams such as sun light or lamp lights, are reflected in the reflective region of each pixel region for displaying images. The spacers 250 with reflective layer 252 are capable of reflecting the ambient light beams transmitted thereto, such that, an efficient utilization of the ambient light beams is increased.

Compared with the conventional LCD device 1, the LCD device 2 uses spacers 250 with reflective layer 252. The spacers 250 filled in the liquid crystal layer 230 are capable of reflecting light beams. Accordingly, light leakage can be eliminated when the LCD device 2 display a black image in a transmissive mode. Moreover, when the LCD device 2 operates in a reflective mode, an efficient utilization of the ambient light beams is increased.

Figure 3:
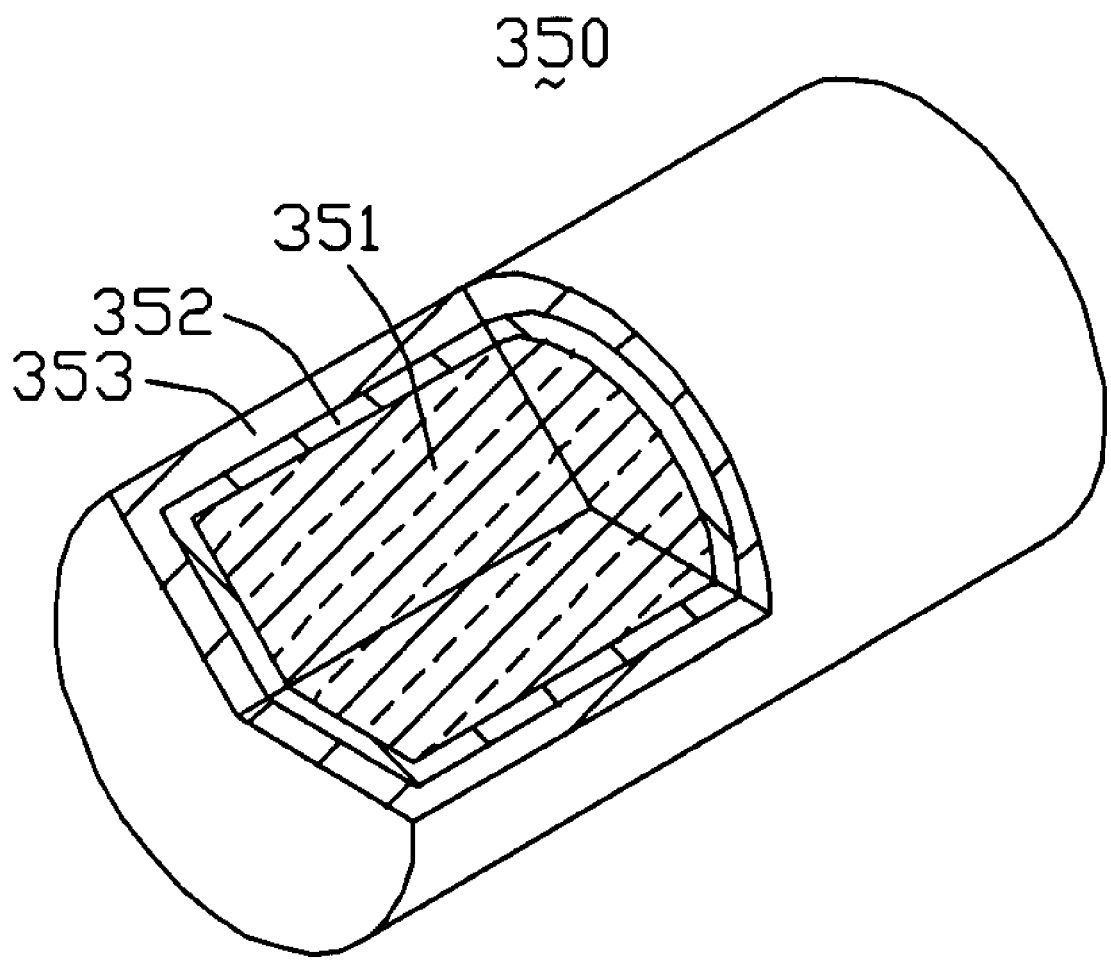
FIG. 3 is a part cross-sectional view of another spacer installing in the LCD device of FIG. 1, showing the spacer having a core portion, a reflective layer, and an adhesive layer.
Figure 4:
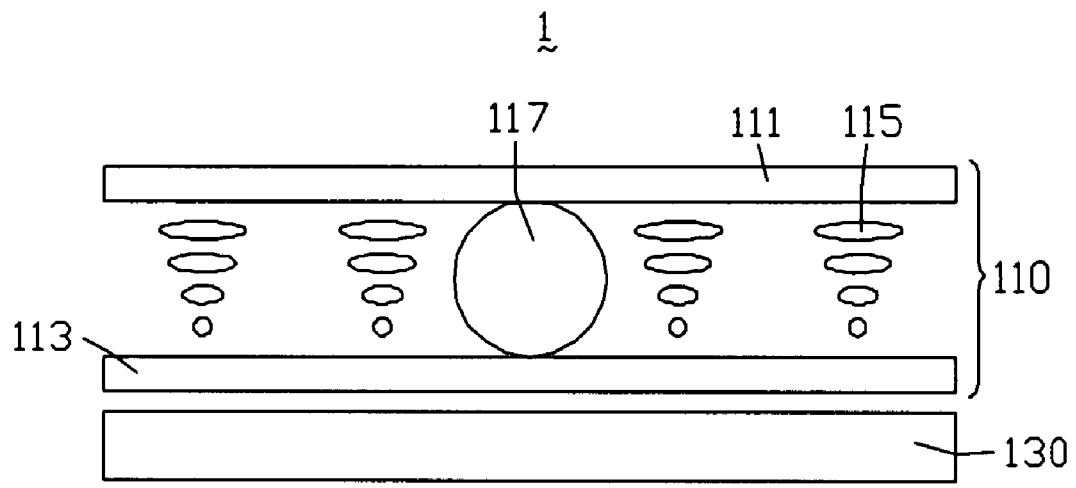
FIG. 4 is an isometric, side view of a conventional LCD device.
Figure 5:
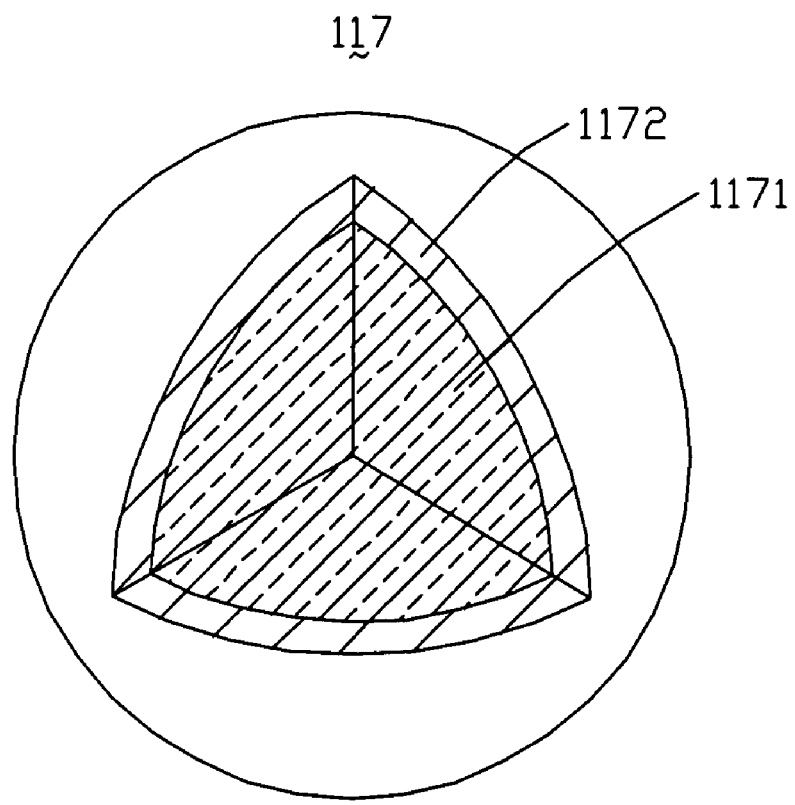
FIG. 5 is a part cross-sectional view of a spacer installing in the LCD of FIG. 4.

Referring to FIG. 3, a part cross-sectional view of another spacer installed in the LCD device 2 is shown. The spacer 350 has a structure similar to that of the spacer 250. However, the spacer 350 has a columnar shape, and includes a columnar core portion 351, a reflective layer 352 and an adhesive layer 353 coated at an outer surface of the core portion 351 orderly.

The core portion 351 may be made of polymethyl methacrylate (PMMA) particles or silicon oxide particles. The reflective layer 352 may be made of Barium sulfate ($BaSO_4$), Magnesium oxide (MgO), or other materials with high reflective ratio. The reflective layer 352 may be formed at the outer surface of the core portion 351 via plating or coating processes, or the like.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal display panel, comprising:
   a pair of substrates spaced from each other in a vertical direction;
   a liquid crystal layer sandwiched between the substrates;
   a plurality of spacers distributed in the liquid crystal layer and between the substrates to resist compression forces in the vertical direction; and
   a plurality of pixel regions, each of the pixel regions defining a reflection region and a transmission region;
   wherein each of the spacers comprises a core portion and a reflective layer, and the reflective layer covers an outer surface of the core portion.

2. The liquid crystal display panel as claimed in claim 1, wherein each of the spacers further comprises a transparent adhesive layer covering the reflective layer.

3. The liquid crystal display panel as claimed in claim 1, wherein the spacers are ball spacers.

4. The liquid crystal display panel as claimed in claim 1, wherein each of the spacers has a columnar shape.

5. The liquid crystal display panel as claimed in claim 1, wherein a material of the reflective layer is barium sulfate ($BaSO_4$).

6. The liquid crystal display panel as claimed in claim 1, wherein a material of the reflective layer is magnesium oxide (MgO).

7. A liquid crystal display device, comprising:
   a liquid crystal display panel; and
   a backlight module configured for illuminating the liquid crystal display panel;
   wherein the liquid crystal display panel comprises a pair of substrates spaced from each other in a vertical direction, a liquid crystal layer sandwiched between the substrates, and a plurality of reflective spacers distributed in the liquid crystal layer and between the substrates to resist compression forces in the vertical direction, each of the spacers comprises a core portion and a reflective layer, and the reflective layer covers an outer surface of the core portion.

8. The liquid crystal display device as claimed in claim 7, wherein each of the spacers further comprises a transparent adhesive layer covering the reflective layer.

9. The liquid crystal display device as claimed in claim 7, wherein the spacers are ball spacers.

10. The liquid crystal display device as claimed in claim 7, wherein each of the spacers has a columnar shape.

11. The liquid crystal display device as claimed in claim 7, wherein the reflective layer is made of one of barium sulfate ($BaSO_4$) and magnesium oxide (MgO).

12. The liquid crystal display device as claimed in claim 7, further comprising a plurality of pixel regions, each of the pixel regions defining a reflection region and a transmission region.

13. A liquid crystal display panel, comprising:
   a pair of substrates spaced from each other in a vertical direction;
   a liquid crystal layer sandwiched between the substrates;
   a plurality of ball spacers distributed in the liquid crystal layer and between the substrates to resist compression forces in the vertical direction, wherein each of the ball spacers comprises a reflective layer; and
   a plurality of pixel regions, each of the pixel regions defining a reflection region and a transmission region.

* * * * *